US012758912B2

(12) United States Patent
Wu et al.

(10) Patent No.: US 12,758,912 B2
(45) Date of Patent: Oct. 13, 2026

(54) FILTERING DEVICE

(71) Applicant: YIMAO ENVIRONMENTAL TECHNOLOGY CO., LTD., Suqian City (CN)

(72) Inventors: Longtao Wu, Suqian City (CN); Kai Chen, Suqian City (CN); Leilei Chen, Suqian City (CN); Baoxiang Song, Suqian City (CN); Yafei Wang, Suqian City (CN); Xiaoyu Zhang, Suqian City (CN)

(73) Assignee: YIMAO ENVIRONMENTAL TECHNOLOGY CO., LTD., Suqian City (CN)

( * ) Notice: Subject to any disclaimer, the term of this patent is extended or adjusted under 35 U.S.C. 154(b) by 557 days.

(21) Appl. No.: 18/276,250

(22) PCT Filed: Dec. 20, 2021

(86) PCT No.: PCT/CN2021/139749
§ 371 (c)(1),
(2) Date: Aug. 8, 2023

(87) PCT Pub. No.: WO2023/087478
PCT Pub. Date: May 25, 2023

(65) Prior Publication Data
US 2024/0109016 A1 Apr. 4, 2024

(51) Int. Cl.
*B01D 46/52* (2006.01)
*B01D 46/00* (2022.01)
*B01D 46/88* (2022.01)

(52) U.S. Cl.
CPC ....... *B01D 46/521* (2013.01); *B01D 46/0004* (2013.01); *B01D 46/88* (2022.01)

(58) Field of Classification Search
None
See application file for complete search history.

(56) References Cited

U.S. PATENT DOCUMENTS

| | | | | |
|---|---|---|---|---|
| 2003/0230063 | A1 * | 12/2003 | Kubokawa ............. | B01D 46/10 55/497 |
| 2008/0115475 | A1 * | 5/2008 | Sandberg ............... | B01D 46/10 55/507 |
| 2020/0398202 | A1 * | 12/2020 | Duvall ............... | B01D 46/0001 |

FOREIGN PATENT DOCUMENTS

| | | |
|---|---|---|
| CN | 103203144 A | 7/2013 |
| CN | 203790746 U | 8/2014 |

(Continued)

*Primary Examiner* — Richard C Gurtowski
(74) *Attorney, Agent, or Firm* — Cheng-Ju Chiang

(57) ABSTRACT

Disclosed is a filtering device. The device includes a main body part and a filter element assembly, where the main body part has a mounting cavity for accommodating the filter element assembly, further includes a base and a screen cover arranged as a cover of the base, and at least one rack for fixing the filter element assembly is disposed on an inner wall of the screen cover and/or the base; and the filter element assembly includes a folded filter element arranged in a folded shape, and a rubber strip arranged on the folded filter element for maintaining the shape of the folded filter element to facilitate quick assembly and disassembly of the folded filter element. Further, the screen cover and the base are connected through various snap-fit assemblies, without requiring additional connecting members for fixing them, which is convenient for disassembly and assembly, and has a simple structure.

14 Claims, 9 Drawing Sheets

(56) References Cited

FOREIGN PATENT DOCUMENTS

| | | | |
|---|---|---|---|
| CN | 204226064 | U | 3/2015 |
| CN | 105526700 | A | 4/2016 |
| CN | 107413129 | A | 12/2017 |
| CN | 209548828 | U | 10/2019 |
| CN | 211874624 | U | 11/2020 |
| CN | 214319552 | U | 10/2021 |
| JP | 2003-181223 | A | 7/2003 |
| JP | 2008-212858 | A | 9/2008 |

* cited by examiner

FILTERING DEVICE

TECHNICAL FIELD

The present disclosure relates to the technical field of air filtration, and in particular to a filtering device.

BACKGROUND

With the gradual improvement in the living standard of people, people's demands for the life quality become higher and higher. Many families have begun to use air purification devices to improve their living environments. Most of these air purification devices use folded filter elements to enhance the filtering effect. After operating for a long time, the filter elements are easy to absorb and deposit a large amount of impurities. Therefore, users need to regularly remove the filter elements for cleaning or replacement.

In the prior art, a plastic filter screen including a lower cover, an upper cover and a filter element is provided. After being folded, a filter element is arranged between the lower cover and the upper cover in a snap-in connection. When the filter element needs to be removed for cleaning or replacement, it is necessary to remove the snap-in part of the filter element and the plastic filter screen in sequence, which is time-consuming and laborious. Furthermore, when the filter element needs to be mounted again, a user needs to align the snap-in part of the filter element and the plastic filter screen in sequence and then mount it, which also brings great burden to the user. In addition, the connection state of the upper cover and the lower cover in the prior art is controlled through a rotary switch, which remains inconvenient for the user to use.

Therefore, it is very necessary to design a filtering device with simple structure, convenient disassembly and assembly of a filter element, and quick disassembly of a screen cover and a base of a filter screen.

SUMMARY

In order to overcome the above problems, the present disclosure provides a filtering device, where a screen cover and a base are connected through a variety of snap-fit assemblies, which is convenient for disassembly and assembly, and no additional connecting members are required to fix the two; further, a folded filter element is fixed by a rubber strip, and long racks adapted to a shape of the folded filter element are arranged on the screen cover and/or the base, so that the folded filter element is directly connected with the long racks in alignment, facilitating quick disassembly of the folded filter element.

In order to achieve the above objectives, the present disclosure adopts a technical solution as follows:

A filtering device comprising a main body part and a filter element assembly, the main body part has a mounting cavity for accommodating the filter element assembly, the main body part comprises a base and a screen cover arranged as a cover of the base, and at least one rack assembly is disposed on an inner wall of the screen cover and/or the base; and the filter element assembly comprises a folded filter element arranged in a folded shape, and a rubber strip arranged on the folded filter element for maintaining the shape of the folded filter element.

Further, the screen cover and the base are connected in a detachable or rotational manner; and the screen cover comprises a first filter member and a first outer frame disposed at the outer periphery of the first filter member, and the base comprises a bottom plate, a peripheral wall arranged on the bottom plate, and a square groove enclosed by the bottom plate and the peripheral wall.

Further, the folded filter element comprises a plurality of V-shaped portions connected in sequence, snap-in teeth are arranged at one side of the rack close to the folded filter element, and toothed grooves for accommodating the V-shaped portion are formed between two snap-in teeth.

Further, the screen cover is arranged in a square structure, and at least one first long rack is disposed at the bottom end thereof, the shape of the base is adapted to the shape of the screen cover, and at least one second long rack corresponding to the position of the first long rack is disposed at the top end of the base; and The bottom end of the first long rack is sequentially provided with a plurality of first snap-in teeth along its length direction, and the top end of the second long rack is sequentially provided with a plurality of second snap-in teeth along its length direction, and second toothed grooves for accommodating the first snap-in teeth are formed between the two adjacent second snap-in teeth, and shapes of the second toothed grooves and the first snap-in teeth are the same.

Further, the first long racks are arranged in two groups, the two groups of first long racks are arranged in the length direction of the screen cover and are symmetrically arranged at the upper and lower ends of inner walls of the screen cover, first protruding structures are arranged both at the left and right ends of the inner walls of the screen cover, the first protruding structures are arranged in a width direction of the screen cover, and the first long racks are located between two groups of the first protruding structures; and the second long racks are arranged in two groups, the two groups of second long racks are symmetrically arranged at the upper and lower ends of the inner walls of the second outer frame, positions of the second long racks correspond to positions of the first long racks; second protruding structures are symmetrically arranged at the upper and lower ends of base in its length direction, the second protruding structures are located on the outer side of the second long racks to form first accommodating grooves with the second long racks, and two first accommodating grooves are separately used to accommodate the edge portions of the upper and lower ends of the folded filter element.

Further, third protruding structures are symmetrically arranged on left and right ends of the base in its width direction, the second long racks are located between the two groups of third protruding structures, fourth protruding structures are arranged side by side at the end of the two groups of the third protruding structures away from the second long racks, and second accommodating grooves for accommodating the first protruding structures are formed between the third protruding structures and the fourth protruding structures.

Further, a plurality of interconnected ventilation holes are formed on both the screen cover and the base, and shapes of the ventilation holes include are not limited to regular hexagon, triangle, or quadrangle.

Further, a plurality of rack groups are arranged on the inner walls of the screen cover in its width direction.

Further, the ventilation holes are arranged in a regular-hexagon shape, and any one of the rack groups includes a plurality of short racks arranged side by side, and the plurality of short racks are separately arranged at horizontal connection positions of the two adjacent ventilation holes.

Further, the ventilation holes are arranged in a triangular shape, the rack groups are formed as third long racks, the third long racks are arranged on the inner walls of the screen cover in the length direction of the screen cover, and the third long racks are separately arranged in parallel at horizontal connection positions of the two adjacent ventilation holes.

Further, a plurality of sliding grooves are symmetrically arranged on the left and right ends of inner peripheral walls of the base, a plurality of racks are arranged in parallel in two groups in a length direction of the base and formed as fourth long racks, two sliding grooves symmetrically arranged on the left and right ends respectively correspond to accommodate the left and right ends of the fourth long racks, and the fourth long racks and the sliding grooves are connected in a sliding manner.

Further, the screen cover and the base are connected in a detachable manner through a snap-fit assembly; the snap-fit assembly comprises a plurality of snap-in protrusions formed on inner peripheral walls of the screen cover, a plurality of snap-in grooves formed on the inner peripheral walls of the base, and snap fasteners capable of being detachable connections corresponding to the plurality of snap-in grooves, respectively, and the plurality of snap-in protrusions are correspondingly snapped into the plurality of snap-in grooves.

Further, shapes of the snap-in grooves are adapted to the shape of the snap-in protrusions, and a snap-in column is arranged in each snap-in groove in its length direction; and a column groove for accommodating the snap-in column is formed on the bottom end of each snap fastener, a snap-fitting portion is formed on the snap fastener, and the snap-fit portion is connected to a snap fastener groove on the top of the screen cover.

Further, the screen cover and the base are connected in a detachable manner through a snap-fit assembly; the snap-fit assembly comprises a snap-in hook arranged at the bottom end of the screen cover, snap-fit portions arranged on the inner peripheral walls of the base, and a switch board in sliding connection with the snap-fit portions; and the switch board has an open state and a closed state, the snap-in hook is disposed in an L-shaped structure, and the bottom end of the snap-in hook is connected with the switch board in the closed state.

Further, each snap-fit portion comprises a sliding member arranged on the inner peripheral wall of the base and an opening member arranged on an outer peripheral wall of the base; and the sliding member is communicated with the opening member; and the switch board is accommodated in the sliding member and is connected with the sliding member in a sliding manner, and a limiting protrusion is formed on the outer end face of the other end of the switch board; the limiting protrusion is accommodated in the opening member, and slides back and forth in the opening member; and one end of the switch board away from the limiting protrusion is snapped into the snap-in hook.

Further, upper rotatable protrusions are formed at the lower end of inner peripheral walls of the screen cover, upper rotatable grooves are formed at the upper end of the inner peripheral walls thereof, upper rotatable columns are arranged in the upper rotatable grooves, and upper round grooves are arranged at the bottom end of the upper rotatable protrusions; and lower rotatable grooves are formed at the end of the inner peripheral walls of the base close to the upper rotatable grooves, lower rotatable columns in rotational connection with the upper round grooves are arranged in the lower rotatable grooves, lower rotatable protrusions are formed at the end of the inner peripheral walls of the base close to the upper rotatable grooves, and a connecting cavity is formed on an outer side wall of each lower rotatable protrusion; the connecting cavity is used to accommodate a connecting protrusion formed on the lower part of a rotatable member, and a lower round groove in rotational connection with the upper rotatable column is formed on the upper part of the rotatable member.

Compared with the prior art, the present disclosure has the following beneficial effects:

In the filtering device of the present disclosure, the screen cover and the base are connected through a variety of snap-fit assemblies, which is convenient for disassembly and assembly, and no additional connecting members are required to fix the two. In addition, a folded filter element is fixed by a rubber strip, and long racks adapted to a shape of the folded filter element are arranged on the screen cover and/or the base, so that the folded filter element is directly connected with the long racks in alignment, facilitating quick disassembly of the folded filter element, which is more convenient for assembly and disassembly, and reducing the labor intensity of the operator. Further, existing filters are generally made of non-woven or paper frames, and the frames are glued together to prevent air leakage. However, the present disclosure is a reusable frame, which ensures the air tightness of the frames through snap-fitting connection of all racks, thereby reducing the use of glue and conducing to environmental protection.

DETAILED DESCRIPTIONS OF THE EMBODIMENTS

For making the objectives, technical solutions and advantages of the present disclosure clearer, the present disclosure will be further described in detail below in conjunction with the accompanying drawings and specific embodiments.

It should be further noted that, in order to avoid obscuring the present disclosure due to unnecessary details, only the structure and/or processing steps closely related to the solution according to the present disclosure are shown in the accompanying drawings, while other details that have little to do with the present disclosure are omitted.

In addition, it should be noted that terms "comprising", "including" or any other variants thereof are intended to cover the non-exclusive including, thereby making that the process, method, object or apparatus comprising a series of elements comprise not only those elements but also other elements that are not listed explicitly or the inherent elements to the process, method, merchandise or apparatus.

Embodiment 1

Figure 1:
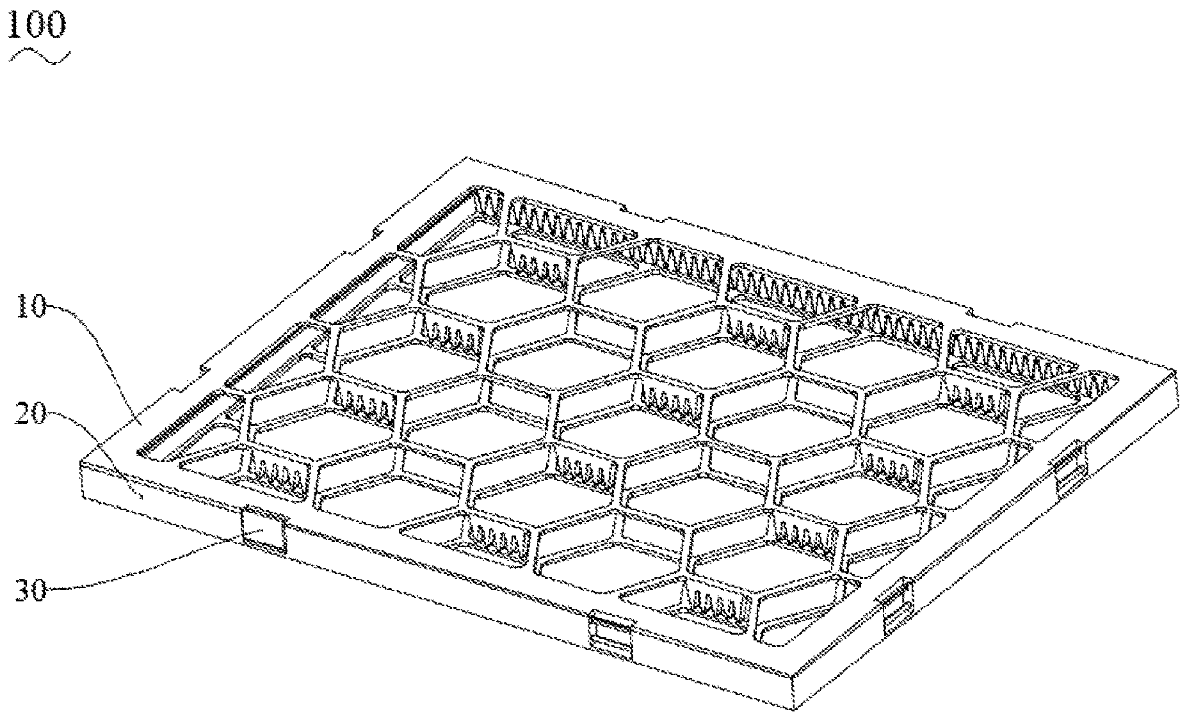
FIG. 1 is a structural schematic diagram of a filtering device in Embodiment 1 of the present disclosure.
Figure 2:
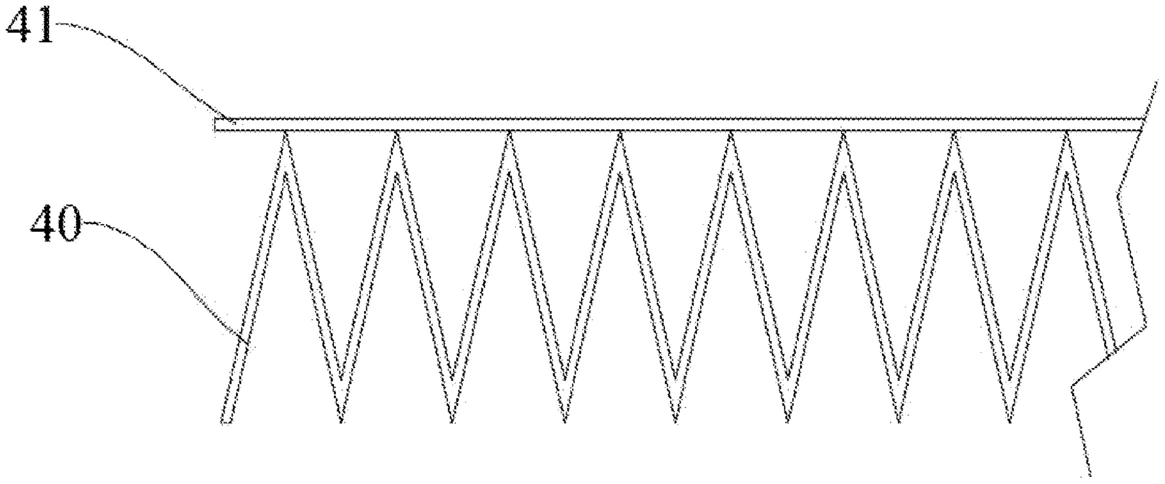
FIG. 2 is a structural schematic diagram of a folded filter element of the filtering device in Embodiment 1 of the present disclosure.
Figure 3:
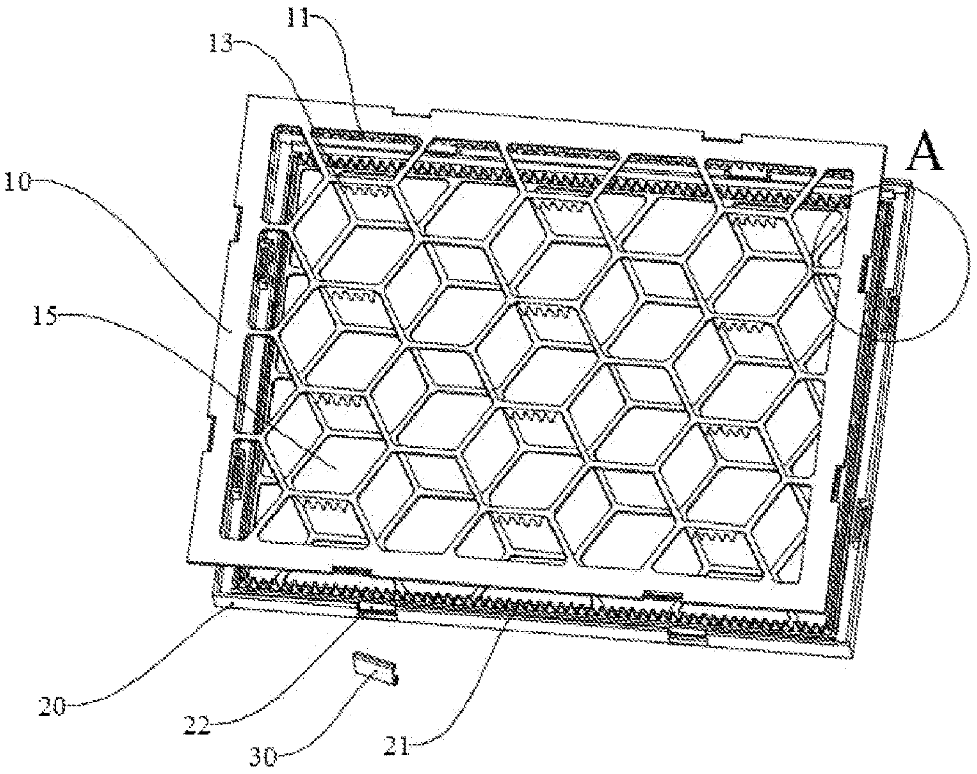
FIG. 3 is an exploded view of the filtering device in Embodiment 1 of the present disclosure.

As shown in FIGS. 1-2, the present embodiment provides a filtering device 100, including a main body part and a filter element assembly disposed in the main body part, and the filter element assembly can filter the air flowing through the main body part. The filter element assembly includes a folded filter element 40 arranged in a folded shape, and a rubber strip 41 arranged on the folded filter element 40 for maintaining the shape of the folded filter element 40. The folded-shape structure of the filter element can increase the surface area of the filter element and improve the filtering efficiency of the filter element. Specifically, the rubber strip 41 is pasted onto the top of the folded filter element 40 in a direction perpendicular to a crease of the folded filter element 40, so as to fix the folded shape of the folded filter element 40 to facilitate subsequent disassembly of the folded filter element 40. The main body part includes a base 20 and a screen cover 10 arranged as a cover of the base 20. The screen cover 10 is connected with the base 20 through snap-fit assemblies, which is convenient for disassembly and assembly, and no additional connecting members are required to fix the two, thereby reducing the cost.

As shown in FIGS. 2-5, the screen cover 10 is arranged in a square structure, including a first filter member with ventilation holes and a first outer frame disposed at the outer periphery of the first filter member. First long racks 11 are arranged both at the upper and lower ends of the inner wall of the screen cover 10. The first longs rack 11 are arranged in a length direction of the screen cover 10, first protruding structures 12 are arranged both at the left and right ends of the inner wall of the screen cover 10, the first protruding structures 12 are arranged in a width direction of the screen cover 10, and the first long racks 11 are located between two groups of the first protruding structures 12.

Figure 4:
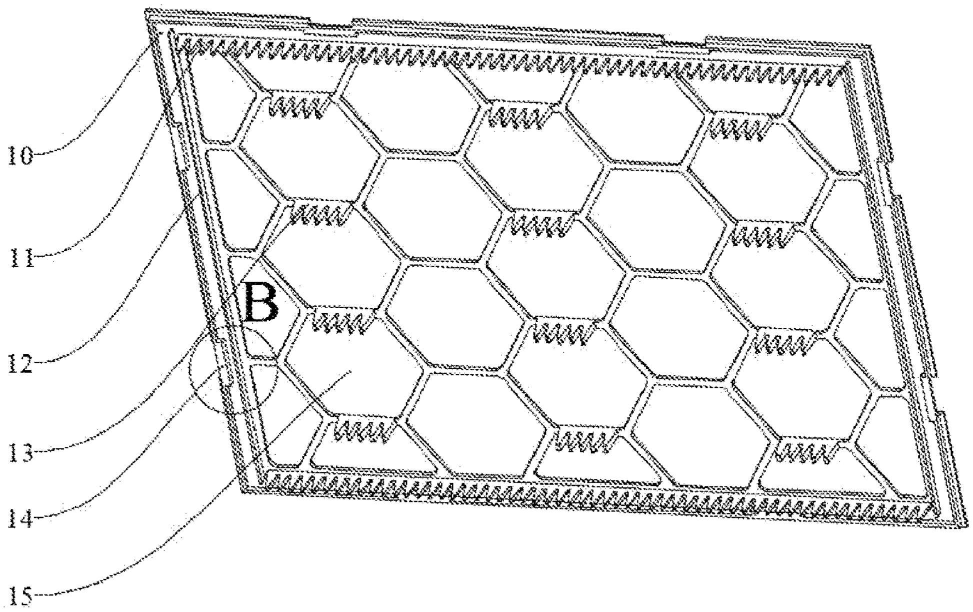
FIG. 4 is a structural schematic diagram of a screen cover of the filtering device in Embodiment 1 of the present disclosure.

As shown in FIG. 4, a plurality of interconnected ventilation holes arranged in a regular-hexagon shape are formed on the first filter member, and a plurality of short racks 13 are arranged on the inner wall of the ventilation holes. The short racks 13 can support the middle of the folded filter element 40 to prevent the folded filter element 40 from being deformed by wind pressure during use. In the present embodiment, the short racks 13 are arranged at a horizontal connection position of two adjacent ventilation holes 15 in the length direction of the screen cover 10.

Specifically, in the present embodiment, groups of the short racks 13 are arranged in four rows, and each row includes three short racks 13. Adjacent short racks 13 in the same row are separated by a distance of one ventilation hole 15. Two adjacent short racks 13 in the same column are separated by a distance of one ventilation hole 15.

The base 20 is adapted to the shape of the screen cover 10 to ensure that the screen cover 10 and the base 20 can be connected in alignment. The base 20 includes a bottom plate, peripheral walls arranged on the bottom plate and a square groove enclosed by the bottom plate and the peripheral walls. The square groove is used to accommodate the folded filter element 40 and other components. Accordingly, the base 20 includes a second filter member with hexagonal ventilation holes and a second outer frame disposed at the outer periphery of the second filter member. Second long racks 21 are arranged both at the upper and lower ends of the inner walls of the second outer frame, and positions of the second long racks 21 correspond to positions of the first long racks 11. Specifically, each first long rack 11 has a plurality of first snap-in teeth, each second long rack 21 has a plurality of second snap-in teeth, second toothed grooves for accommodating the first snap-in teeth are formed between the two adjacent second snap-in teeth, and shapes of the second toothed grooves and the first snap-in teeth are the same, so as to ensure that the first long racks 11 and the second long racks 21 can be connected in alignment. In the present embodiment, the first snap-in teeth are arranged in a V-shaped structure.

By means of the arrangement, the first long racks 11 and the second long racks 21 are arranged on the screen cover 10 and the base 20 respectively, the first long racks 11 are in fit connection with the second long racks 21, and the folded filter element 40 is pressed between them, so that the air tightness of the filter screen is guaranteed. Further, a plurality of groups of short racks 13 are arranged at the bottom end of the screen cover 10 to support the folded filter element 40, and prevent the folded filter element 40 from being deformed during use.

As shown in FIGS. 2-5, the folded filter element 40 includes a plurality of V-shaped portions connected in sequence, and the length of the folded filter element 40 is greater than the lengths of the first long racks 11 and the second long racks 21. The V-shaped portion is formed by folding the filter element layer by layer. The V-shaped portions are adapted to the shapes of the second toothed grooves, and the connection between the two adjacent V-shaped portions is accommodated in the second toothed grooves, so that the folding position of the folded filter element 40 is clamped in the toothed grooves at the connection of the first long racks and the second long racks. Particularly, the arrangement of the rubber strip 41 can ensure that a shape of the V-shaped portions of the folded filter element 40 remains fixed, so as to achieve the prefixation of the folded filter element 40. When the folded filter element 40 is placed directly on the second long racks 21, the V-shaped portions of the folded filter element 40 automatically correspond to and are in snap-in connection with the second toothed grooves of the second long racks 21, and there is no need to align the V-shaped portions with the second toothed grooves, greatly saving the assembly time of the folded filter element 40. In such a way, edges of both ends of the folded filter element 40 are respectively located on the left and right sides of the second long racks 21. When the screen cover 10 is corresponding placed and covered on the base 20, the first snap-in teeth of the first long racks 11 correspond to and are in snap-in connection with the second toothed grooves of the second long racks 21 one by one, so that the folded portion of the folded filter element 40 is pressed tightly. At the same time, the first protruding structures 12 on both sides of the first long racks 11 correspondingly press the edges of the folded filter element 40 at both ends.

Preferably, the rubber strip 41 is arranged at the edge position of the folded filter element 40. By means of the arrangement, when the screen cover 10 is in snap-in connection with the base 20, the rubber strip 41 is accommodated in the accommodation space formed by the first outer frame and the second outer frame, which not only ensures the aesthetics of the filtering device 100, but also does not affect the filtering efficiency of the folded filter element 40.

Figure 5:
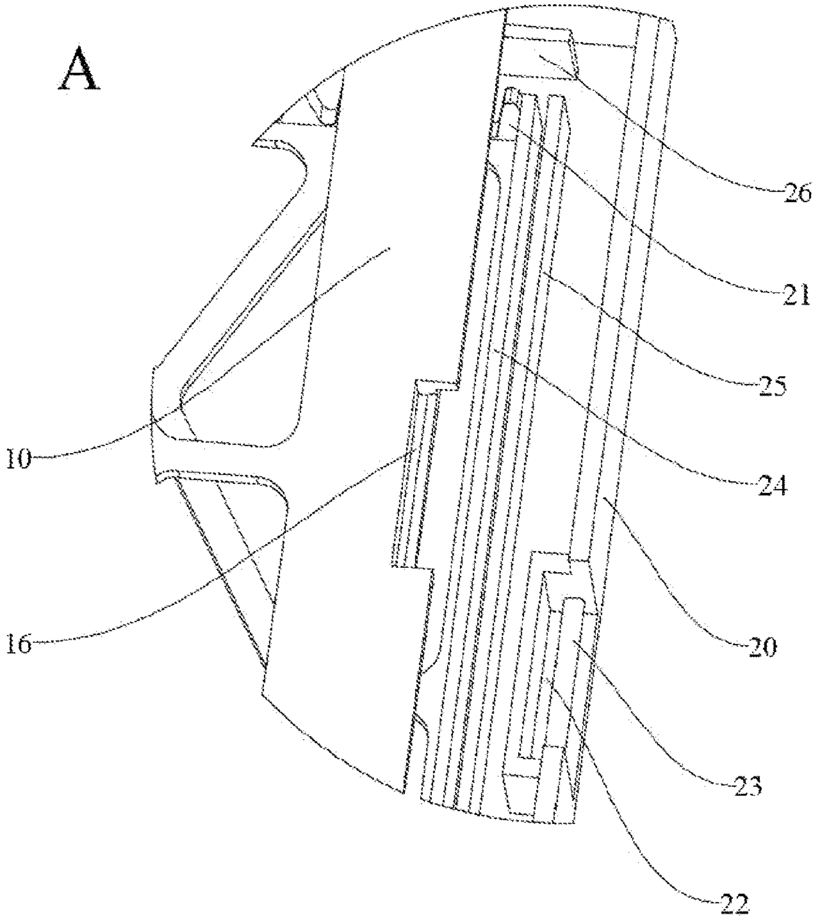
FIG. 5 is a partial enlarged view of an area A in FIG. 3.

As shown in FIG. 5, in some embodiments, second protruding structures 26 are symmetrically arranged at the upper and lower ends of base 20 in its length direction. Since the width of the folded filter element 40 is greater than the distance between two groups of the second long racks 21, when the folded filter element 40 is in a compressed state, the upper and lower ends of the folded filter element 40 are respectively located on the outer sides of the second long racks 21. The second protruding structures 26 are located on the outer side of the second long racks 21 to form first accommodating grooves with the second long racks 21. The first accommodating grooves are used for accommodating the upper and lower ends of the folded filter element 40 to achieve the compression of the upper and lower ends of the folded filter element 40.

Third protruding structures 24 are symmetrically arranged on left and right ends of the base 20 in its width direction, the second long racks 21 are located between two sets of the third protruding structures 24, and fourth protruding structures 25 are arranged side by side at the end of the two groups of the third protruding structures 24 away from the second long racks 21. Second accommodating grooves for accommodating the first protruding structures 12 are formed between the third protruding structures 24 and the fourth protruding structures 25. When the base 20 is connected with the screen cover 10, the first protruding structures 12 press the left and right ends of the folded filter element 40 down into the second accommodating grooves respectively, so as to press the folded filter element 40 tightly.

By means of the arrangement, when the screen cover 10 is connected to the base 20, the protruding structures can be in interlaced connection with one another by arranging a plurality of protruding structures on the screen cover 10 and the base 20, so that edges of the folded filter element 40 are pressed tightly.

Figure 6:
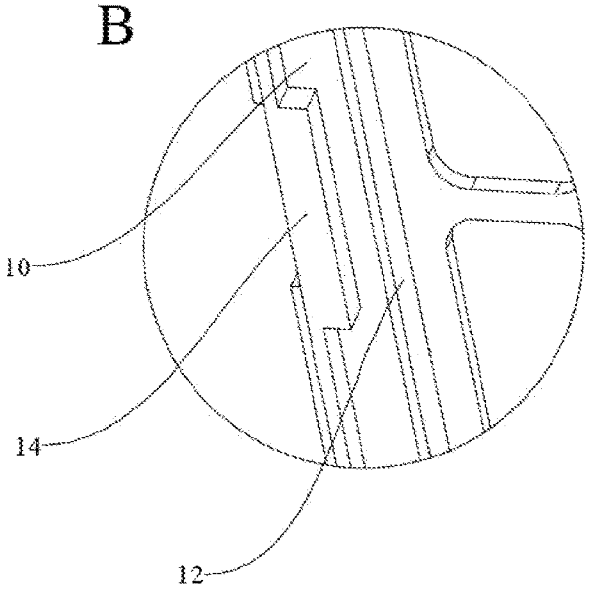
FIG. 6 is a partial enlarged view of an area B in FIG. 4.
Figure 7:
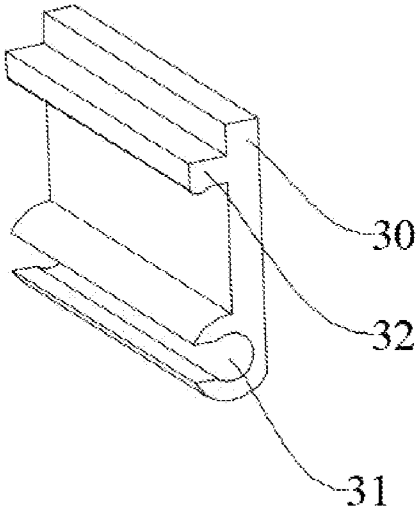
FIG. 7 is a structural schematic diagram of a snap fastener of the filtering device in Embodiment 1 of the present disclosure.

As shown in FIG. 7, and with reference to FIGS. 4-6, in some embodiments, each snap-fit assembly includes a plurality of snap-in protrusions 14 formed on inner peripheral walls of the screen cover 10, a plurality of snap-in grooves 22 formed on inner peripheral walls of the base 20, and snap fasteners 30 capable of being detachable connections corresponding to the plurality of snap-in grooves 22, respectively. The plurality of snap-in protrusions 14 are correspondingly snapped into the plurality of snap-in grooves 22, so that the screen cover 10 and the base 20 can be connected in alignment, and the screen cover 10 is fixed to the base 20 through the snap fasteners 30. Particularly, a plurality of groups of the snap-fit assemblies are arranged, and separately formed on side walls of the main body part, so as to ensure that the screen cover 10 and the base 20 are completely fixed.

Specifically, shapes of the snap-in grooves 22 are adapted to the shape of the snap-in protrusions 14, so that the snap-in protrusions 14 are snapped into the snap-in grooves 22 to prevent the snap-in protrusions 14 from moving. A snap-in column 23 is arranged in each snap-in groove 22 in its length direction, and a column groove 31 for accommodating the snap-in column 23 is formed on the bottom end of each snap fastener 30. An opening is formed on a peripheral wall of the column groove 31 in its axial direction to ensure that the column groove 31 is not completely sealed, thereby facilitating the separation of the snap-in column 23 from the column groove 31 and realizing detachable connection between the snap fastener 30 and the base 20. A snap-fitting portion 32 is formed on the snap fastener 30, and the snap-fit portion 32 is connected to a snap fastener groove 16 on the top of the screen cover 10. The snap-fit portion 32 and the snap fastener groove 16 are separately provided with a slope structure to guarantee a stable connection between the snap-fit portion 32 and the snap fastener groove 16 and facilitate the disassembly. In such a way, when the screen cover 10 needs to be connected to the base 20, the column groove 31 of the snap fastener 30 is snapped into the snap-in column 23, and the snap-fit portion 32 of the snap fastener 30 is pressed into the snap fastener groove 16; when the screen cover 10 needs to be detached from the base 20, the snap-fit portion 32 is pushed outwards, and the snap-in column 23 is then detached from the column groove 31.

Specific working mode of the present disclosure is described below:

When a user needs to replace the folded filter element 40, the snap-fitting portion 32 is pressed outwards, and the snap-in column 23 is detached from the column groove 31, so that the connection between the screen cover 10 and the base 20 is released. Subsequently, the screen cover 10 is detached from the base 20, the folded filter element 40 is taken out for replacement, and the folded position of the new folded filter element 40 pre-fixed by the rubber strip 41 is directly placed in the toothed groove of the second long racks 21. When the folded filter element 40 is completely aligned with the two groups of the second long racks 21, the screen cover 10 is snapped onto the base 20 in alignment. Finally, the column groove 31 of the snap fastener 30 is snapped into the snap-in column 23, and the snap-fit portion 32 of the snap fastener 30 is pressed into the snap fastener groove 16, so that the screen cover 10 is fixed onto the base 20.

Embodiment 2

Figure 8:
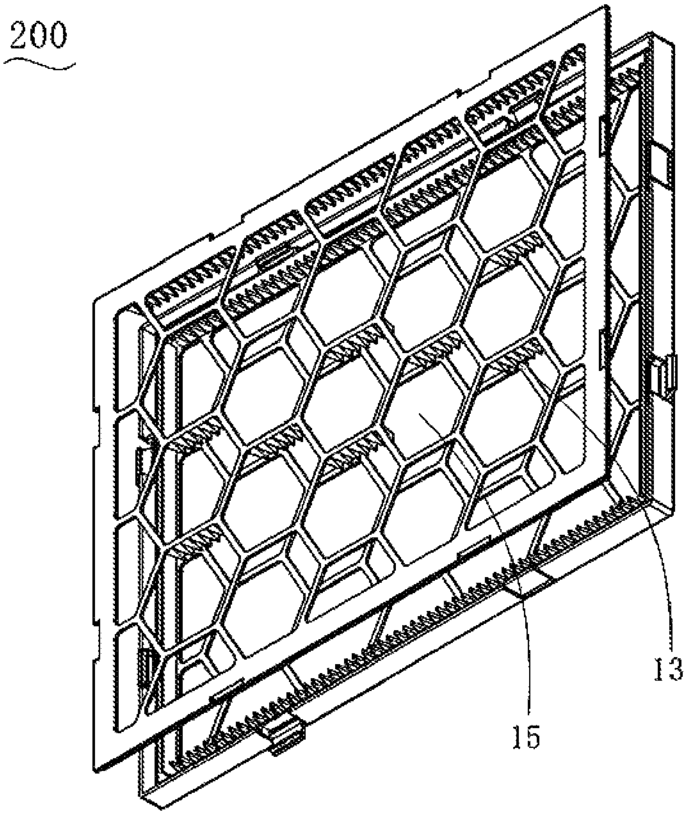
FIG. 8 is a structural schematic diagram of a filtering device in Embodiment 2 of the present disclosure.

As shown in FIG. 8, in the present embodiment, a filtering device 200 is provided, where ventilation holes 15 are arranged in a regular-hexagon shape, a plurality of short racks 13 are arranged in three rows, both the upper and lower ends each have three short racks 13, and the middle row has two short racks 13. The short racks 13 in the same row of the upper and lower rows are separated by a distance of one ventilation hole 15. The short racks 13 in the same column of the upper and lower rows are separately located at the upper and lower ends of the same ventilation hole 15. The short racks 13 in the middle row are arranged between the two adjacent rows of the short rack 13 in the upper and lower rows.

Except for the above structures, the remaining structures of the present embodiment are basically the same as those of Embodiment 1, which are not repeated any more herein.

Embodiment 3

Figure 9:
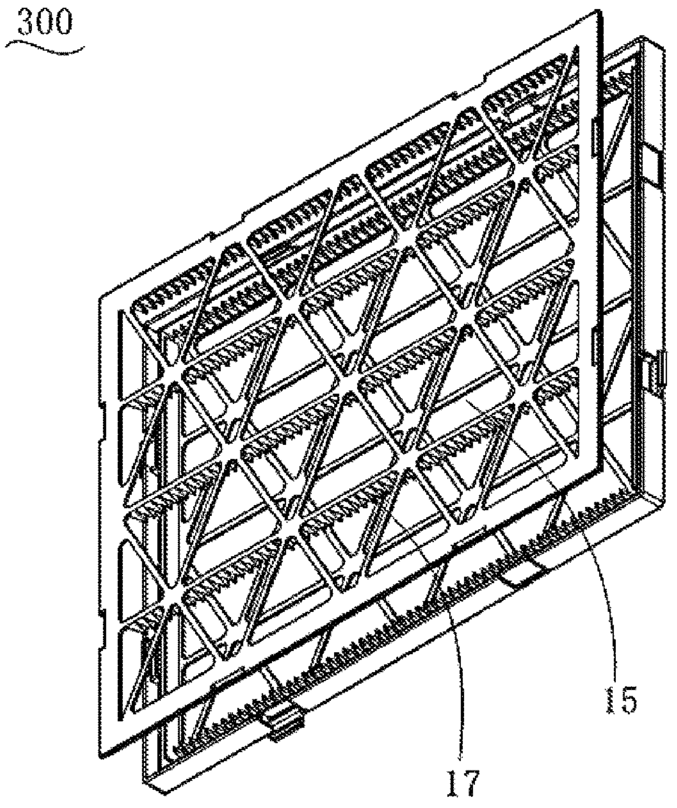
FIG. 9 is a structural schematic diagram of a filtering device in Embodiment 3 of the present disclosure.
Figure 10:
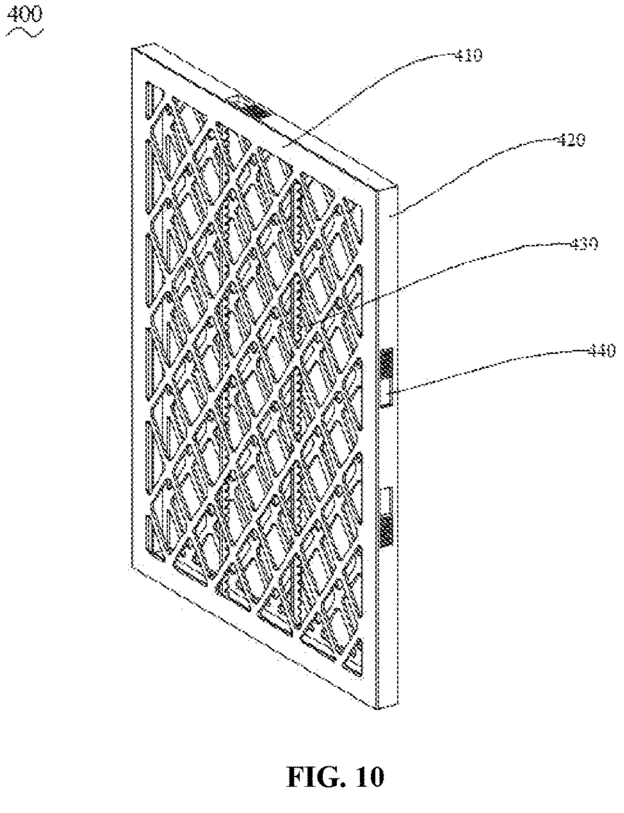
FIG. 10 is a structural schematic diagram of a filtering device in Embodiment 4 of the present disclosure.
Figure 11:
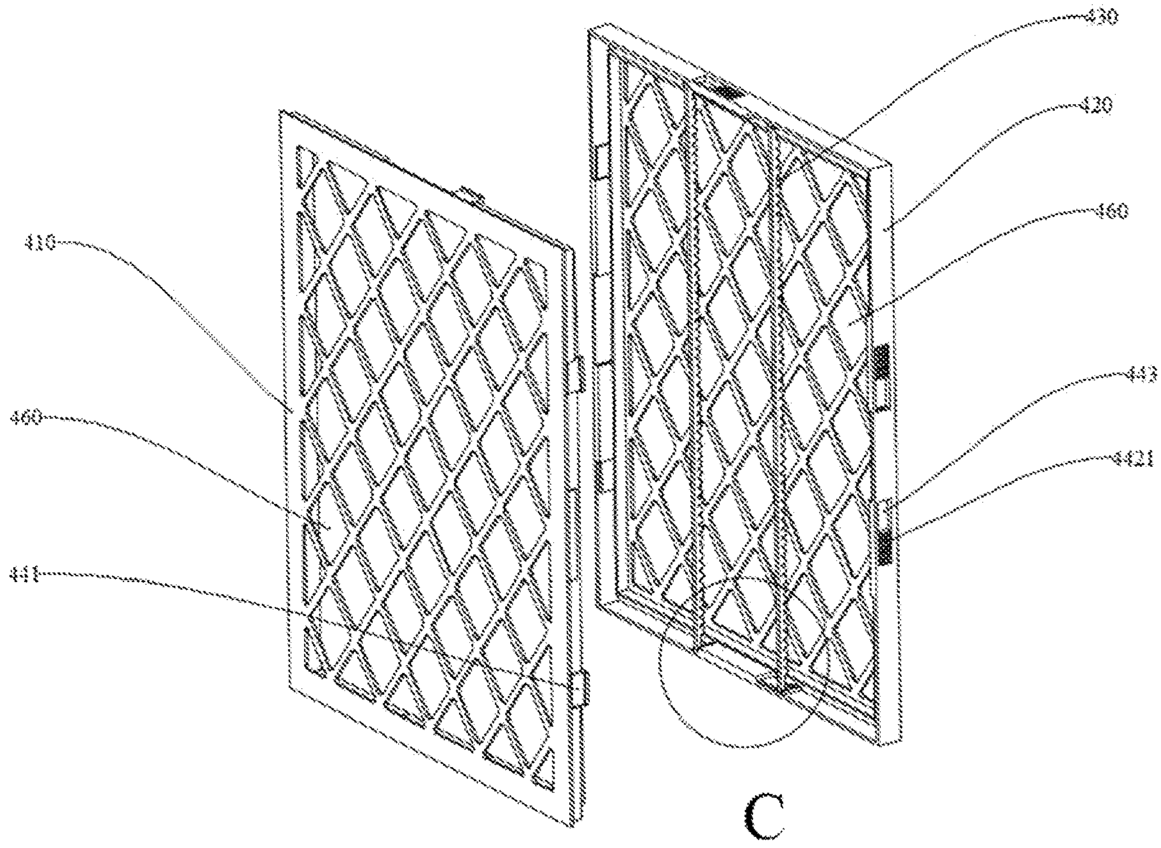
FIG. 11 is an exploded view of the filtering device in Embodiment 4 of the present disclosure.
Figure 12:
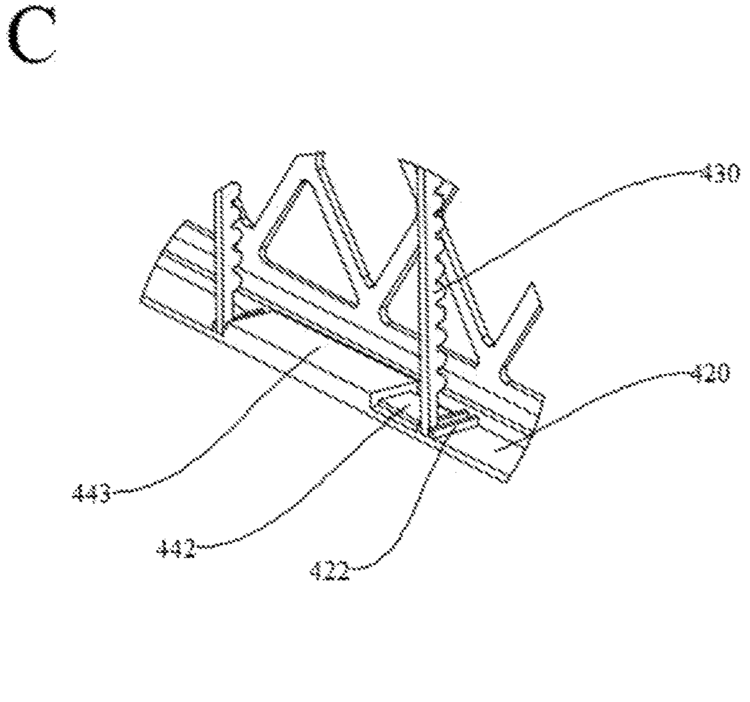
FIG. 12 is a partial enlarged view of an area C in FIG. 11.
Figure 13:
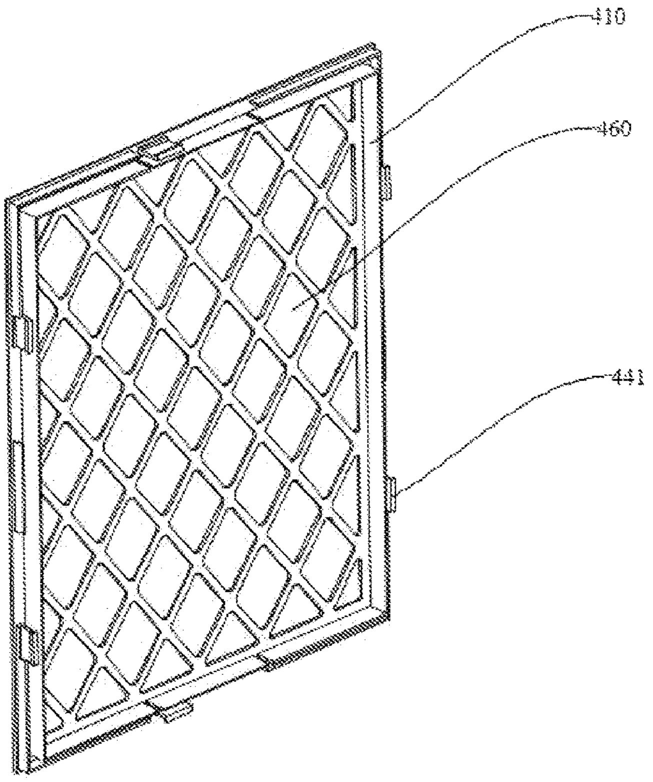
FIG. 13 is a structural schematic diagram of a screen cover of the filtering device in Embodiment 4 of the present disclosure.

As shown in FIG. 9, in the present embodiment, a filtering device 300 is provided, where ventilation holes 15 are arranged in a triangular shape, and a plurality of third long racks 17 are arranged on inner walls of the screen cover 10 in its length direction. The length and extension direction of the third long racks 17 are the same as those of the first long racks 11. The plurality of third long racks 17 are arranged in three groups, and are separately arranged in parallel at horizontal connection positions of the two adjacent ventilation holes 15.

Except for the above structures, the remaining structures of the present embodiment are basically the same as those of Embodiment 1, which are not repeated any more herein.

Embodiment 4

As shown in FIGS. 10-13, in the present embodiment, a filtering device 400 is provided, a plurality of sliding grooves 422 are symmetrically arranged on the left and right ends of inner peripheral walls of the base 420, a plurality of racks are arranged in parallel in two groups in a length direction of the base 420 and formed as fourth long racks 430, two sliding grooves 422 symmetrically arranged on the left and right ends respectively correspond to accommodate the left and right ends of the fourth long racks 430, and the fourth long racks 430 and the sliding grooves 422 are connected in a sliding manner. The sliding grooves 422 are arranged in a vertical direction, and the fourth long racks 430 and the sliding grooves 422 are connected in a sliding manner, so that the fourth long racks 430 can slide up and down relative to the base 420, and the fourth long racks 430 and the base 420 can be quickly disassembled. It is worth noting that the length of the fourth long racks 430 is the same as the width of the square groove, so as to ensure that two ends of the fourth long racks 430 are propped against the inner peripheral walls of the base 420. In such a way that the fourth long racks 430 are arranged as a detachable connection structure with the main body part, the folded filter element 40 can be directly and quickly removed by detaching the fourth long racks 430, which is more convenient and faster.

It is worth noting that, according to the understanding of those skilled in the technical solution of the present disclosure, the sliding grooves 422 can also be symmetrically arranged on the left and right ends of inner peripheral walls of the screen cover, so that the fourth long racks 430 are snapped into the screen cover and are in detachable connection with the screen cover.

In the present embodiment, ventilation holes 460 are formed in a diamond shape.

As shown in FIGS. 10-13, in the present embodiment, each snap-fit assembly 440 includes a snap-in hook 441 arranged at the bottom end of a screen cover 410, snap-fit portions 443 arranged on the inner peripheral walls of the base 420, and a switch board 442 in sliding connection with the snap-fit portions 443. Particularly, a plurality of groups of the snap-fit assemblies 440 are arranged, and separately formed on side walls of the base 420, so as to ensure that the screen cover 410 and the base 420 are completely fixed. The switch board 442 has an open state and a closed state, and a user can slide the switch board 442 to control the connection between the screen cover 410 and the base 420. The snap-in hook 441 is disposed in an L-shaped structure, and the bottom end of the snap-in hook 441 is connected with the switch board 442 in the closed state. When the switch board 442 is in the open state, the horizontal portion at the bottom end of the snap-in hook 441 is snapped into the lower end of the switch board 442, thereby limiting the upward movement of the snap-in hook 441, such that the screen cover 410 and the base 420 are in a connected state. When the switch board 442 is in the open state, the horizontal portion at the bottom end of the snap-in hook 441 is no longer restricted by the switch board 442, and can move upwards relative to the base 420, at which time the screen cover 410 can be detached from the base 420.

Particularly, each snap-fit portion 443 includes a sliding member arranged on the inner peripheral wall of the base 420 and an opening member arranged on an outer peripheral wall of the base 420. The switch board 442 is accommodated in the sliding member and is connected with the sliding member in a sliding manner. The sliding member is hollow inside, and openings are formed on both ends thereof, so as to ensure that the switch board 442 can slide back and forth in the sliding member.

One end of the switch board 442 is snapped into the snap-in hook 441, and a limiting protrusion is formed on the outer end face of the other end thereof. The limiting protrusion is accommodated in the opening member, and slides back and forth in the opening member. The opening member is communicated with the outside of the base 420, and the sliding member is communicated with the opening member, so that the limit protrusion of the switch board 442 is exposed outside the base 420, which is convenient for a user to control the switch board 442 to slide back and forth. An anti-sliding groove 422 is formed on the outer end face of the limiting protrusion, which is convenient for the user to control the sliding of the switch board 442.

By means of the arrangement, when the switch board 442 is in the closed state, the limiting protrusion is located at the end of the opening member close to the snap-in hook 441, and one end of the switch board 442 away from the limiting protrusion is located outside the sliding member and is snapped into the snap-in hook 441. At this time, the screen cover 410 and the base 420 are in a connected state. When the switch board 442 is in the open state, the limiting protrusion slides to the end of the opening member away from the snap-in hook 441, and the end of the switch board 442 away from the limit protrusion slides to the inside of the sliding member and is detached from the snap-in hook 441. At this time, the screen cover 410 and the base 420 are in a detachable state.

Except for the above structures, the remaining structures of the present embodiment are basically the same as those of Embodiment 1, which are not repeated any more herein.

Embodiment 5

Figure 14:
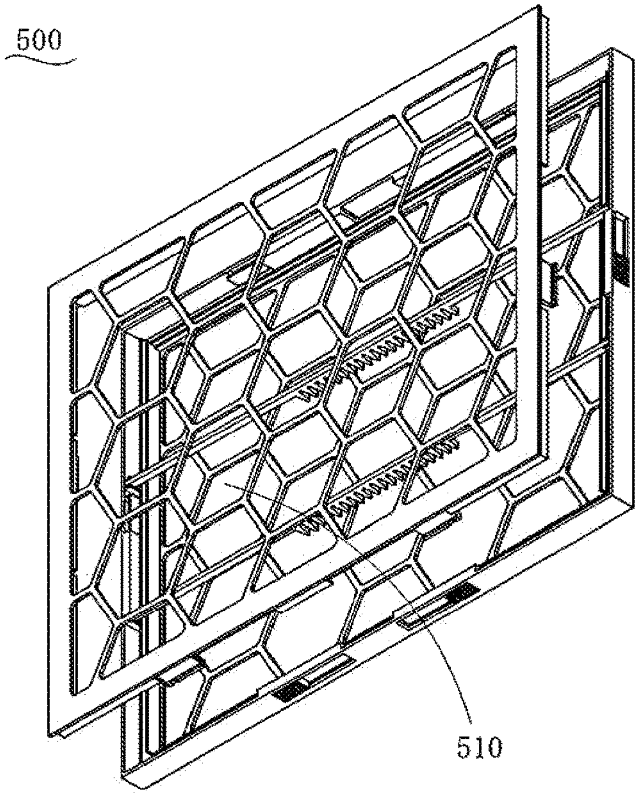
FIG. 14 is a structural schematic diagram of a filtering device in Embodiment 5 of the present disclosure.

As shown in FIG. 14, in the present embodiment, a filtering device 500 is provided, where ventilation holes 510 are arranged in a regular-hexagon shape.

Except for the above structures, the remaining structures of the present embodiment are basically the same as those of Embodiment 4, which are not repeated any more herein.

Embodiment 6

Figure 15:
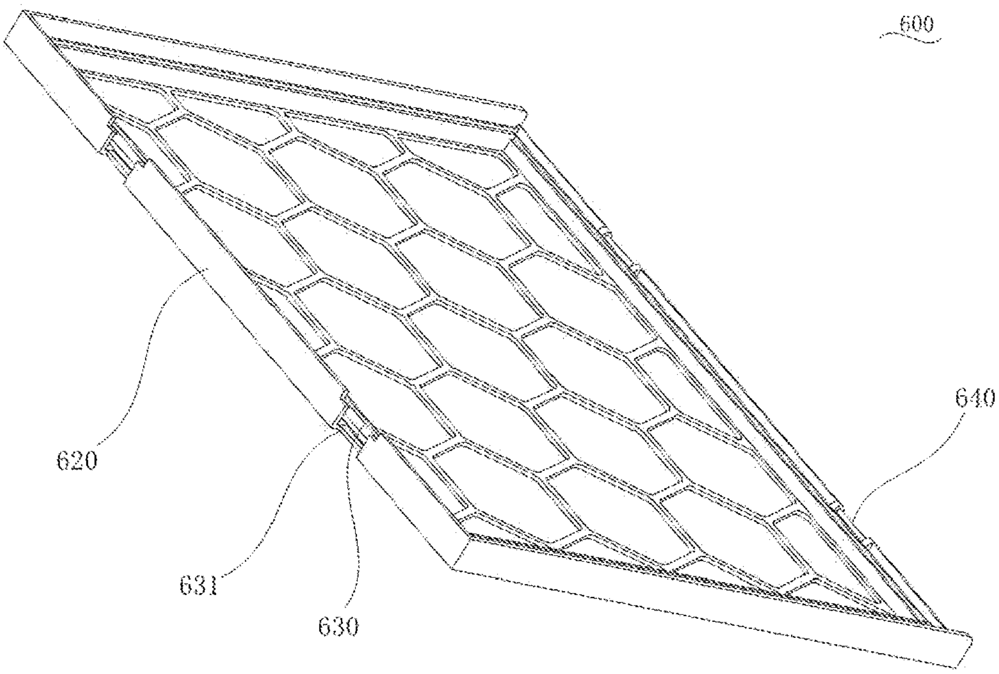
FIG. 15 is a structural schematic diagram of a base in Embodiment 6 of the present disclosure.
Figure 16:
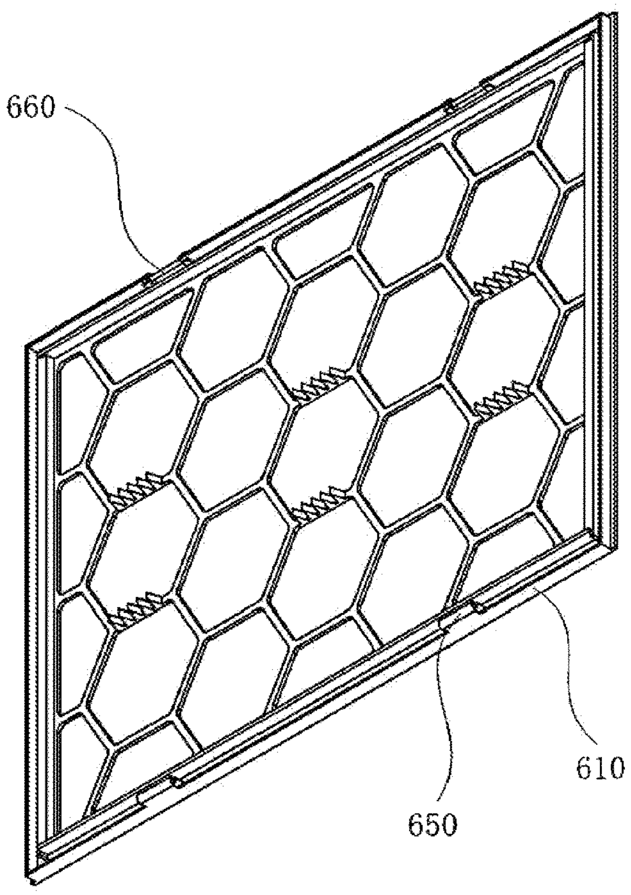
FIG. 16 is a structural schematic diagram of a screen cover of the filtering device in Embodiment 6 of the present disclosure.
Figure 17:
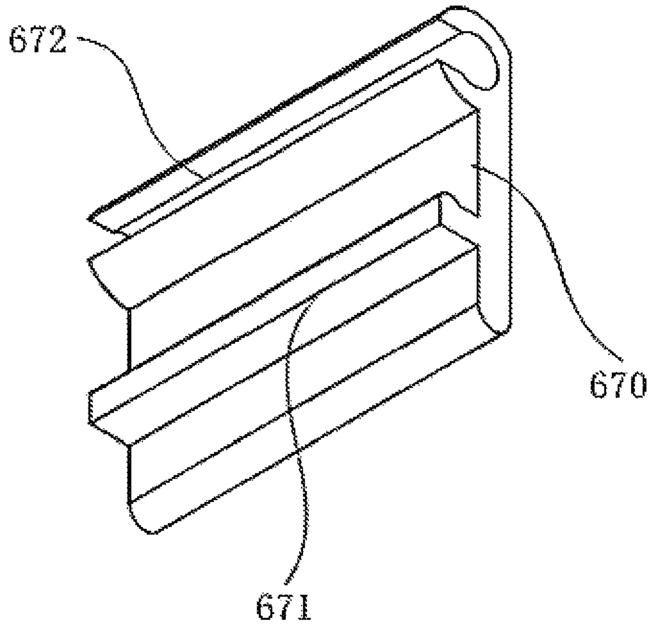
FIG. 17 is a structural schematic diagram of a rotatable member in Embodiment 6 of the present disclosure.

As shown in FIGS. 15-17, in the present embodiment, a filtering device 600 is provided, upper rotatable protrusions 650 are formed at the lower end of inner peripheral walls of the screen cover 610, upper rotatable grooves are formed at the upper end of the inner peripheral walls thereof, upper rotatable columns 660 are arranged in the upper rotatable grooves, and upper round grooves are arranged at the bottom end of the upper rotatable protrusions 650.

Lower rotatable protrusions 630 are formed at the end of the inner peripheral walls of the base 620 close to the upper rotatable grooves, and a connecting cavity 631 is formed on an outer side wall of each lower rotatable protrusion 630; the connecting cavity 631 is used to accommodate a connecting protrusion 671 formed on the lower part of a rotatable member 670, and a lower round groove 672 in rotational connection with the upper rotatable column 660 is formed on the upper part of the rotatable member 670, in such a way, one ends of the base 620 and the screen cover 610 are connected through the rotatable member 670, and the other ends thereof are arranged as in a flexible connection.

Lower rotatable grooves are formed at the end of the inner peripheral walls of the base 620 close to the upper rotatable protrusions 650, and lower rotatable columns 640 in rotational connection with the upper round grooves are arranged in the lower rotatable grooves, so that the opening and close of the screen cover 610 relative to the base 620 are realized, such that the upper rotatable protrusions 650 are snapped into the lower rotatable columns 640, so that the screen cover 610 and the base 620 are closed. The upper rotatable protrusions 650 are detached from the lower rotatable columns 640, so that the screen cover 610 and the base 620 are opened.

Except for the above structures, the remaining structures of the present embodiment are basically the same as those of Embodiment 1, which are not repeated any more herein.

The above description is merely intended for describing the technical solutions of the present disclosure rather than limiting the present disclosure. Although the present disclosure is described in detail with reference to the above-mentioned embodiments, those of ordinary skill in the art should understand that they may still make modifications to the technical solutions described in the embodiments or equivalent substitutions to some or all of the technical features of the technical solutions; equivalent structure or equivalent process change made by using contents of the description and the accompanying drawings in the present disclosure, and used directly or indirectly in other related technical fields should be all included in the scope of patent protection of the present disclosure in the same way.

What is claimed is:

1. A filtering device comprising a main body part and a filter element assembly, wherein the main body part has a mounting cavity for accommodating the filter element assembly, the main body part comprises a base and a screen cover arranged as a cover of the base, and at least one rack for fixing the filter element assembly is disposed on an inner wall of the screen cover and/or the base; and the filter element assembly comprises a folded filter element arranged in a folded shape, and a rubber strip arranged on the folded filter element for maintaining the shape of the folded filter element;

wherein the screen cover and the base are connected in a detachable or rotational manner; and the screen cover comprises a first filter member and a first outer frame disposed at the outer periphery of the first filter member, and the base comprises a bottom plate, a second outer frame disposed at the outer periphery of the bottom plate, and a square groove enclosed by the bottom plate and the second outer frame;

wherein the folded filter element comprises a plurality of V-shaped portions connected in sequence, snap-in teeth are arranged at one side of the rack close to the folded filter element, and toothed grooves for accommodating the V-shaped portion are formed between two snap-in teeth;

wherein at least one first long rack is disposed on an inner wall of the screen cover, the shape of the base is adapted to the shape of the screen cover, and at least one second long rack corresponding to the position of the first long rack is disposed on an inner wall of the base; and each first long rack has a plurality of first snap-in teeth, each second long rack has a plurality of second snap-in teeth, second toothed grooves for accommodating the first snap-in teeth are formed between the two adjacent second snap-in teeth, and shapes of the second toothed grooves and the first snap-in teeth are the same;

wherein the first long racks are arranged in two groups, the two groups of first long racks are arranged in the length direction of the screen cover and are symmetrically arranged at the upper and lower ends of inner walls of the screen cover, first protruding structures are arranged both at the left and right ends of the inner walls of the screen cover, the first protruding structures are arranged in a width direction of the screen cover, and the first long racks are located between two groups of the first protruding structures; and the second long racks are arranged in two groups, the two groups of second long racks are symmetrically arranged at the upper and lower ends of the inner walls of the second outer frame, positions of the second long racks correspond to positions of the first long racks; second protruding structures are symmetrically arranged at the upper and lower ends of base in its length direction, the second protruding structures are located on the outer side of the second long racks to form first accommodating grooves with the second long racks, and two first accommodating grooves are separately used to accommodate the edge portions of the upper and lower ends of the folded filter element.

2. The filtering device according to claim 1, wherein third protruding structures are symmetrically arranged on left and right ends of the base in its width direction, the second long racks are located between the two groups of third protruding structures, fourth protruding structures are arranged side by side at the end of the two groups of the third protruding structures away from the second long racks, and second accommodating grooves for accommodating the first protruding structures are formed between the third protruding structures and the fourth protruding structures.

3. The filtering device according to claim 2, wherein a plurality of interconnected ventilation holes are formed on both the screen cover and the base, and shapes of the ventilation holes include are not limited to regular hexagon, triangle, or quadrangle.

4. The filtering device according to claim 3, wherein a plurality of short racks are arranged on the inner walls of the screen cover in its width direction.

5. The filtering device according to claim 4, wherein the ventilation holes are arranged in a regular-hexagon shape, and the plurality of short racks are separately arranged at horizontal connection positions of the two adjacent ventilation holes.

6. The filtering device according to claim 4, wherein the ventilation holes are arranged in a triangular shape, the short racks are formed as third long racks, the third long racks are arranged on the inner walls of the screen cover in the length direction of the screen cover, and the third long racks are separately arranged in parallel at horizontal connection positions of the two adjacent ventilation holes.

7. The filtering device according to claim 1, wherein a plurality of sliding grooves are symmetrically arranged on the left and right ends of inner peripheral walls of the base, a plurality of racks are arranged in parallel in two groups in a length direction of the base and formed as fourth long racks, two sliding grooves symmetrically arranged on the left and right ends respectively correspond to accommodate the left and right ends of the fourth long racks, and the fourth long racks and the sliding grooves are connected in a sliding manner.

8. The filtering device according to claim 1, wherein the screen cover and the base are connected in a detachable manner through a snap-fit assembly; the snap-fit assembly comprises a plurality of snap-in protrusions formed on inner peripheral walls of the screen cover, a plurality of snap-in grooves formed on the inner peripheral walls of the base, and snap fasteners capable of being detachable connections corresponding to the plurality of snap-in grooves, respectively, and the plurality of snap-in protrusions are correspondingly snapped into the plurality of snap-in grooves.

9. The filtering device according to claim 8, wherein shapes of the snap-in grooves are adapted to the shape of the snap-in protrusions, and a snap-in column is arranged in each snap-in groove in its length direction; and a column groove for accommodating the snap-in column is formed on the bottom end of each snap fastener, a snap-fitting portion is formed on the snap fastener, and the snap-fit portion is connected to a snap fastener groove on the top of the screen cover.

10. The filtering device according to claim 1, wherein the screen cover and the base are connected in a detachable manner through a snap-fit assembly; the snap-fit assembly comprises a snap-in hook arranged at the bottom end of the screen cover, snap-fit portions arranged on the inner peripheral walls of the base, and a switch board in sliding connection with the snap-fit portions; and the switch board has an open state and a closed state, the snap-in hook is disposed in an L-shaped structure, and the bottom end of the snap-in hook is connected with the switch board in the closed state.

11. The filtering device according to claim 10, wherein each snap-fit portion comprises a sliding member arranged on the inner peripheral wall of the base and an opening member arranged on an outer peripheral wall of the base; and the sliding member is communicated with the opening member; and the switch board is accommodated in the sliding member and is connected with the sliding member in a sliding manner, and a limiting protrusion is formed on the outer end face of the other end of the switch board; the limiting protrusion is accommodated in the opening member, and slides back and forth in the opening member; and one end of the switch board away from the limiting protrusion is snapped into the snap-in hook.

12. The filtering device according to claim 1, wherein upper rotatable protrusions are formed at the lower end of inner peripheral walls of the screen cover, upper rotatable grooves are formed at the upper end of the inner peripheral walls thereof, upper rotatable columns are arranged in the upper rotatable grooves, and upper round grooves are arranged at the bottom end of the upper rotatable protrusions; and lower rotatable grooves are formed at the end of the inner peripheral walls of the base close to the upper rotatable grooves, lower rotatable columns in rotational connection with the upper round grooves are arranged in the lower rotatable grooves, lower rotatable protrusions are formed at the end of the inner peripheral walls of the base close to the upper rotatable grooves, and a connecting cavity is formed on an outer side wall of each lower rotatable protrusion; the connecting cavity is used to accommodate a connecting protrusion formed on the lower part of a rotatable member, and a lower round groove in rotational connection with the upper rotatable column is formed on the upper part of the rotatable member.

13. A filtering device comprising a main body part and a filter element assembly, wherein the main body part has a mounting cavity for accommodating the filter element assembly, the main body part comprises a base and a screen cover arranged as a cover of the base, and at least one rack for fixing the filter element assembly is disposed on an inner wall of the screen cover and/or the base;

the filter element assembly comprises a folded filter element arranged in a folded shape, and a rubber strip arranged on the folded filter element for maintaining the shape of the folded filter element;

wherein the screen cover and the base are connected in a detachable or rotational manner; and the screen cover comprises a first filter member and a first outer frame disposed at the outer periphery of the first filter member, and the base comprises a bottom plate, a second outer frame disposed at the outer periphery of the bottom plate, and a square groove enclosed by the bottom plate and the second outer frame;

wherein the screen cover and the base are connected in a detachable manner through a snap-fit assembly; the snap-fit assembly comprises a snap-in hook arranged at the bottom end of the screen cover, snap-fit portions arranged on the inner peripheral walls of the base, and a switch board in sliding connection with the snap-fit portions; and the switch board has an open state and a closed state, the snap-in hook is disposed in an L-shaped structure, and the bottom end of the snap-in hook is connected with the switch board in the closed state;

wherein each snap-fit portion comprises a sliding member arranged on the inner peripheral wall of the base and an opening member arranged on an outer peripheral wall of the base; and the sliding member is communicated with the opening member; and the switch board is accommodated in the sliding member and is connected with the sliding member in a sliding manner, and a limiting protrusion is formed on the outer end face of the other end of the switch board; the limiting protrusion is accommodated in the opening member, and slides back and forth in the opening member; and one end of the switch board away from the limiting protrusion is snapped into the snap-in hook.

14. A filtering device comprising a main body part and a filter element assembly, wherein the main body part has a mounting cavity for accommodating the filter element assembly, the main body part comprises a base and a screen cover arranged as a cover of the base, and at least one rack for fixing the filter element assembly is disposed on an inner wall of the screen cover and/or the base;

the filter element assembly comprises a folded filter element arranged in a folded shape, and a rubber strip arranged on the folded filter element for maintaining the shape of the folded filter element;

wherein the screen cover and the base are connected in a detachable or rotational manner; and the screen cover comprises a first filter member and a first outer frame disposed at the outer periphery of the first filter member, and the base comprises a bottom plate, a second outer frame disposed at the outer periphery of the bottom plate, and a square groove enclosed by the bottom plate and the second outer frame;

wherein upper rotatable protrusions are formed at the lower end of inner peripheral walls of the screen cover, upper rotatable grooves are formed at the upper end of the inner peripheral walls thereof, upper rotatable columns are arranged in the upper rotatable grooves, and upper round grooves are arranged at the bottom end of the upper rotatable protrusions; and lower rotatable grooves are formed at the end of the inner peripheral walls of the base close to the upper rotatable grooves, lower rotatable columns in rotational connection with the upper round grooves are arranged in the lower rotatable grooves, lower rotatable protrusions are formed at the end of the inner peripheral walls of the base close to the upper rotatable grooves, and a connecting cavity is formed on an outer side wall of each lower rotatable protrusion; the connecting cavity is used to accommodate a connecting protrusion formed on the lower part of a rotatable member, and a lower round groove in rotational connection with the upper rotatable column is formed on the upper part of the rotatable member.

* * * * *